United States Patent
Yang et al.

(10) Patent No.: US 12,021,368 B2
(45) Date of Patent: Jun. 25, 2024

(54) SURGE PROTECTION APPARATUS

(71) Applicant: Delta Electronics, Inc., Taoyuan (TW)

(72) Inventors: Shan-Chun Yang, Taoyuan (TW);
Mu-Bo Chang, Taoyuan (TW);
Kuan-Lung Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/731,669

(22) Filed: Apr. 28, 2022

(65) Prior Publication Data

US 2023/0352926 A1  Nov. 2, 2023

(51) Int. Cl.
*H02H 3/20* (2006.01)
*H02H 3/04* (2006.01)

(52) U.S. Cl.
CPC ............... *H02H 3/04* (2013.01); *H02H 3/20* (2013.01)

(58) Field of Classification Search
CPC .. H02H 3/04; H02H 3/20; H02H 9/06; H02H 3/08; H01C 7/12; H01T 4/06; H01H 83/10; G01R 31/28
USPC .................................................. 361/117–120
See application file for complete search history.

(56) References Cited

U.S. PATENT DOCUMENTS

| | | | | |
|---|---|---|---|---|
| 5,136,460 A * | 8/1992 | Misencik | ............... | H02H 9/044 361/117 |
| 5,206,779 A * | 4/1993 | Sato | ........................ | H02H 9/005 439/825 |
| 5,748,430 A * | 5/1998 | Bird | .................... | H01R 13/6666 361/111 |
| 9,466,975 B2 * | 10/2016 | Mickievicz | .......... | H05K 5/0286 |
| 9,812,858 B2 * | 11/2017 | Kawabata | ................ | H01C 7/12 |
| 2004/0171286 A1 * | 9/2004 | Baker | ..................... | H04Q 1/146 439/76.1 |
| 2005/0047049 A1 * | 3/2005 | Bell | ........................ | H04Q 1/116 361/118 |
| 2015/0214700 A1 * | 7/2015 | Bergeron | ............... | H04Q 1/116 361/119 |

(Continued)

FOREIGN PATENT DOCUMENTS

JP 2011083096 A 4/2011
JP 2016001988 A 1/2016

OTHER PUBLICATIONS

Office Action of its corresponding JP application No. 2022-147148 (issued on Dec. 5, 2023) with its English machine translation.

*Primary Examiner* — Danny Nguyen
(74) *Attorney, Agent, or Firm* — Muncy, Geissler, Olds & Lowe, P.C

(57) ABSTRACT

A surge protection apparatus includes a chassis, a surge circuit breaker, and a surge protection module. The chassis has an accommodating space and an opening, and the opening is communicated with the accommodating space. The surge circuit breaker is disposed in the accommodating space. The surge protection module is configured to be electrically connected to a second connector in the chassis, and the second connector is electrically connected to the surge circuit breaker. The surge protection module extends in a first axis, and the surge protection module is plugged in or pulled out of the chassis through the opening along the first axis. The surge protection module includes a first connector detachably connected to the second connector.

18 Claims, 6 Drawing Sheets

(56) References Cited

U.S. PATENT DOCUMENTS

2018/0159319 A1* 6/2018 Miller ................. H01Q 1/50
2018/0254629 A1* 9/2018 Gattis ................. H01C 7/126

* cited by examiner

SURGE PROTECTION APPARATUS

BACKGROUND OF THE DISCLOSURE

Field of the Disclosure

The present disclosure relates to a surge protection apparatus, and particularly to a surge protection apparatus having a pluggable surge protection module with a warning element.

Description of the Related Art

With the advancement of technology, power supply systems have become very popular and important. In the process of supplying power to electronic devices via a power supply system, it is possible to encounter abnormal overvoltage. When such an overvoltage surge hits an electronic device, it may damage the components in the electronic device.

Therefore, in general, surge protectors are often used to protect electronic devices. However, these surge protectors can also be damaged by a surge of overvoltage. At this time, it can be difficult for the user to determine whether the surge protector has been damaged and needs to be repaired or replaced.

Therefore, how to quickly and effectively monitor whether the surge protector is damaged is a topic that needs to be discussed and solved.

BRIEF SUMMARY OF THE DISCLOSURE

Accordingly, one objective of the present disclosure is to provide a surge protection apparatus to solve the above problems.

A surge protection apparatus includes a chassis, a surge circuit breaker, and a surge protection module. The chassis has an accommodating space and an opening, and the opening is communicated with the accommodating space. The surge circuit breaker is disposed in the accommodating space. The surge protection module is configured to be electrically connected to a second connector in the chassis, and the second connector is electrically connected to the surge circuit breaker. The surge protection module extends in a first axis, and the surge protection module is plugged in or pulled out of the chassis through the opening along the first axis. The surge protection module includes a first connector detachably connected to the second connector.

According to some embodiments, the surge protection module has a long strip-shaped structure, the surge protection module includes a surge protection device, and when the surge protection module is pulled out of the opening, the surge protection device is replaceable.

According to some embodiments, the surge protection module has a casing and a first warning element, the first warning element is disposed in the casing, and a through hole is formed on the casing, wherein when the surge protection device is broken, the first warning element is observable through the through hole.

According to some embodiments, the surge protection module further has a second warning element, and when the surge protection device is broken and is pulled out of the chassis, the second warning element is observable.

According to some embodiments, when the surge protection module is plugged into the chassis, the through hole is exposed from the opening.

According to some embodiments, the surge protection apparatus further includes a monitoring device, the surge protection module has a monitoring terminal configured to send a monitoring signal to the monitoring device, and the monitoring device is configured to determine whether the surge protection module is broken according to the monitoring signal.

According to some embodiments, the surge protection apparatus includes a plurality of surge protection modules, and the monitoring terminals of the surge protection modules are connected in series.

According to some embodiments, the first connector extends along the first axis and has two input terminals, the input terminals have a column-shaped structure, bullet-shaped structure or plate-shaped structure, configured to be plugged into two corresponding female heads of the second connector, and the two female heads are electrically connected to the surge circuit breaker.

According to some embodiments, the surge protection module further includes an insulation base, the insulation base is configured to separate the two input terminals along a second axis, and the second axis is perpendicular to the first axis.

According to some embodiments, the surge protection module has two output terminals, which are electrically connected to a loading device, and the two output terminals are connected to the loading device in a pluggable manner.

According to some embodiments, the surge protection apparatus includes a plurality of surge protection modules separately arranged along a second axis, and the second axis is perpendicular to the first axis.

According to some embodiments of the disclosure, the present disclosure provides a surge protection apparatus includes a chassis, a surge circuit breaker and a surge protection module. The chassis has an accommodating space and an opening, and the opening is communicated with the accommodating space. The surge circuit breaker is disposed in the accommodating space. The surge protection module is configured to be electrically connected to the surge circuit breaker. The surge protection module extends in a first axis, and the surge protection module is plugged in or pulled out of the chassis through the opening along the first axis. The surge protection module includes a first connector extending along the first axis, and the first connector is detachably connected to a second connector in the chassis. The surge protection module has a casing and a first warning element, the first warning element is disposed in the casing, a through hole is formed on the casing, and the first warning element is configured to issue a warning message through the through hole.

The present disclosure provides a surge protection apparatus, which includes a chassis and a plurality of surge protection modules. The surge protection modules are pluggably installed in the chassis and configured to protect the corresponding loading devices. When one of the surge protection modules is broken, the user can easily see the warning message issued by the first warning element on the broken surge protection module without removing the top cover, and the user can also easily pull out the surge protection module to replace the broken surge protection device on the surge protection module. Therefore, the design of the present disclosure can effectively improve the maintenance efficiency.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
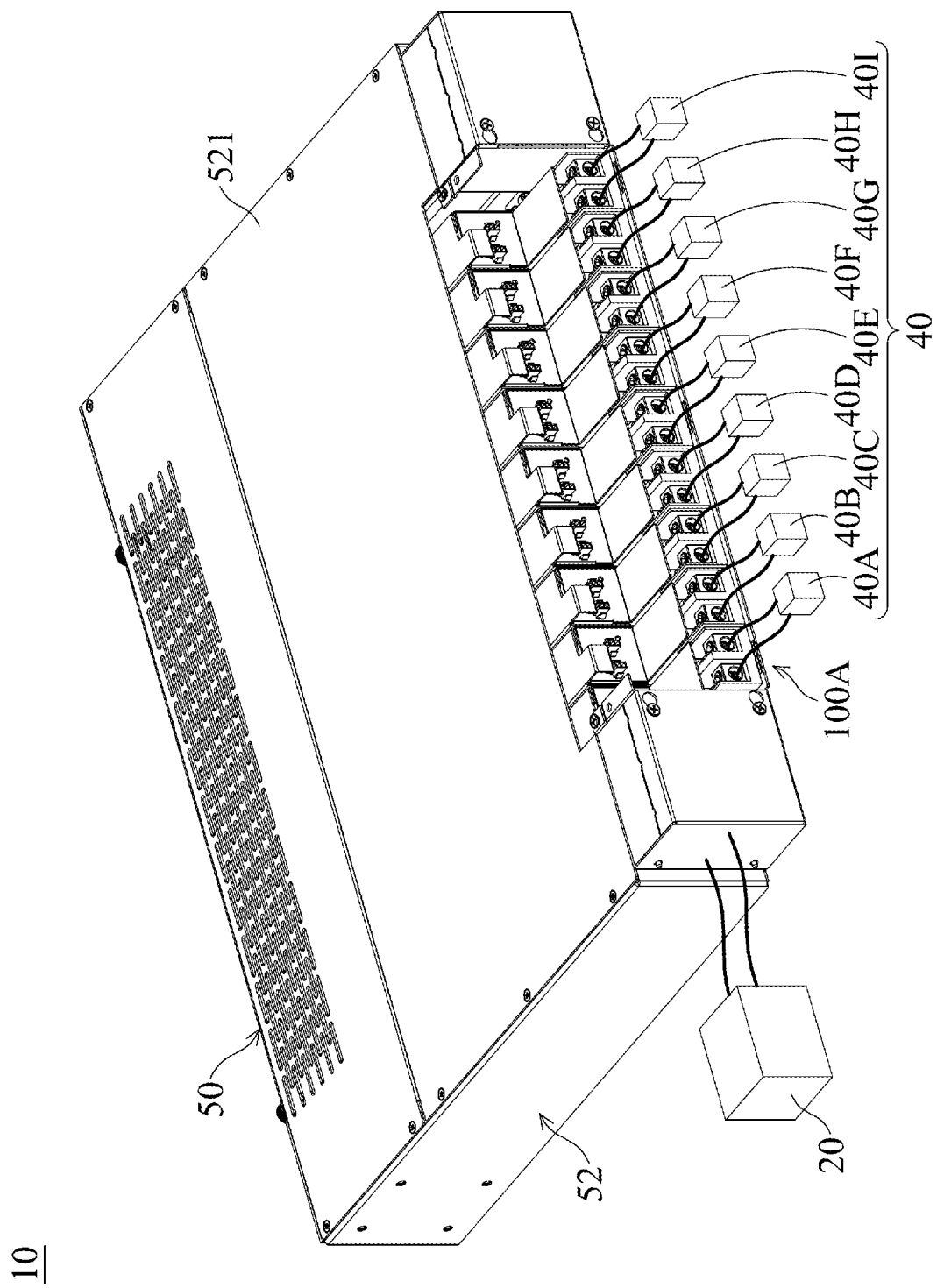
FIG. 1 is a schematic diagram of a surge protection system 10 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

Figure 2:
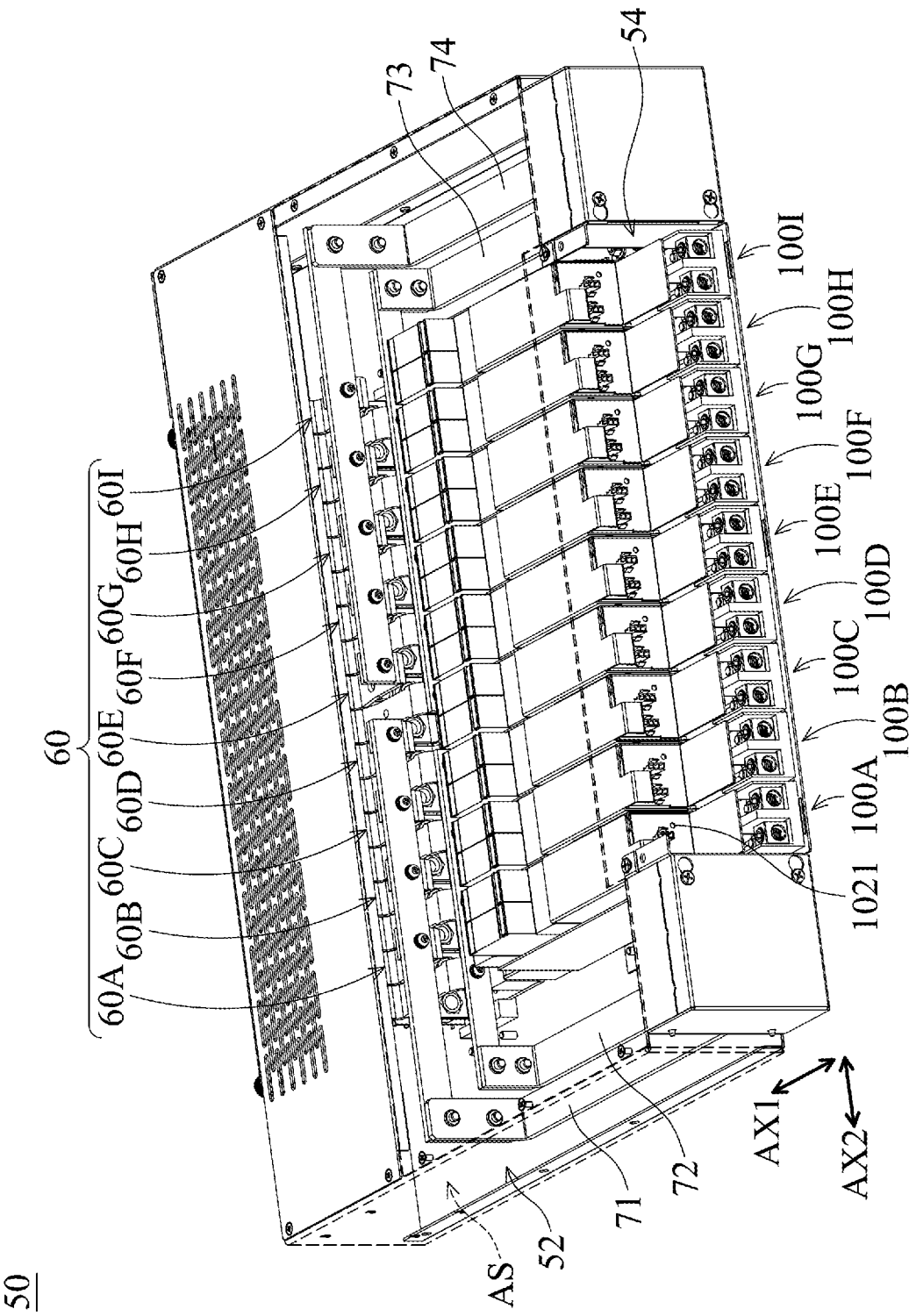
FIG. 2 is a schematic diagram of a surge protection apparatus 50 according to an embodiment of the present disclosure.

Please refer to FIG. 1 and FIG. 2. FIG. 1 is a schematic diagram of a surge protection system 10 according to an embodiment of the present disclosure, and FIG. 2 is a schematic diagram of a surge protection apparatus 50 according to an embodiment of the present disclosure. The surge protection system 10 includes a power source 20, a loading group 40 and the surge protection apparatus 50. The power source 20 provides power to the surge protection apparatus 50, and then the surge protection apparatus 50 transmit the power to the loading group 40.

The loading group 40 includes a plurality of loading devices 40A to 40I, and the loading device may be an electronic device, a computer, a server, or the like. The surge protection apparatus 50 is configured to protect these loading devices 40A to 40I from being damaged due to transitory surges and impulse. The surge protection apparatus 50 includes a plurality of surge protection modules 100A to 100I respectively corresponding to the loading devices 40A to 40I. For example, surge protection module 100A is configured to protect loading device 40A, surge protection module 100B is configured to protect loading device 40B, and so on.

In this embodiment, the surge protection apparatus 50 includes a chassis 52, conducting members 71 to 74, a surge protection assembly 60 and the surge protection modules 100A to 100I. The chassis 52 has an accommodating space AS, and the conducting members 71 to 74, the surge protection assembly 60 and the surge protection modules 100A to 100I are disposed in the accommodating space AS. The conducting members 71 to 74 have a plate-shaped structure and configured to be electrically connected to the surge protection assembly 60 and the power source 20.

The surge protection assembly 60 includes a plurality of surge circuit breakers 60A to 60I, the conducting members 71, 72 are configured to transmit power from the power source 20 to the surge circuit breakers 60A to 60D, and the conducting members 73, 74 are configured to transmit power from the power source 20 to the surge circuit breakers 60E to 60I.

In particular, the surge circuit breakers 60A to 60I are respectively electrically connected to the surge protection modules 100A to 100I in parallel, the surge circuit breakers 60A to 60I are respectively electrically connected to the loading devices 40A to 40I in series, and the surge protection modules 100A to 100I are electrically connected to the loading devices 40A to 40I in parallel.

The surge circuit breakers 60A to 60I are configured to control the current drawn from the power source 20 by the loading devices 40A to 40I. For example, When the output current from the power source 20 is too large, the surge circuit breakers 60A to 60I will limit the output current or interrupt the output current. In addition, it should be noted that the number of the surge circuit breakers 60A to 60I is not limited to this embodiment. For example, the surge protection assembly 60 may has only one surge circuit breaker which is electrically connected to the power source 20, the loading devices 40A to 40I and the surge protection modules 100A to 100I.

The surge protection modules 100A to 100I respectively protect the loading devices 40A to 40I. For example, when a surge occurs in the process of the power source 20 supplying current to the loading device 40A, the surge protection module 100A can absorb the surge to prevent the surge from entering the loading device 40A and causing damage to the loading device 40A. After absorbing the surge, the surge protection module 100A may be damaged, but the surge circuit breaker 60A continues to transmit the current to loading device 40A.

Figure 3:
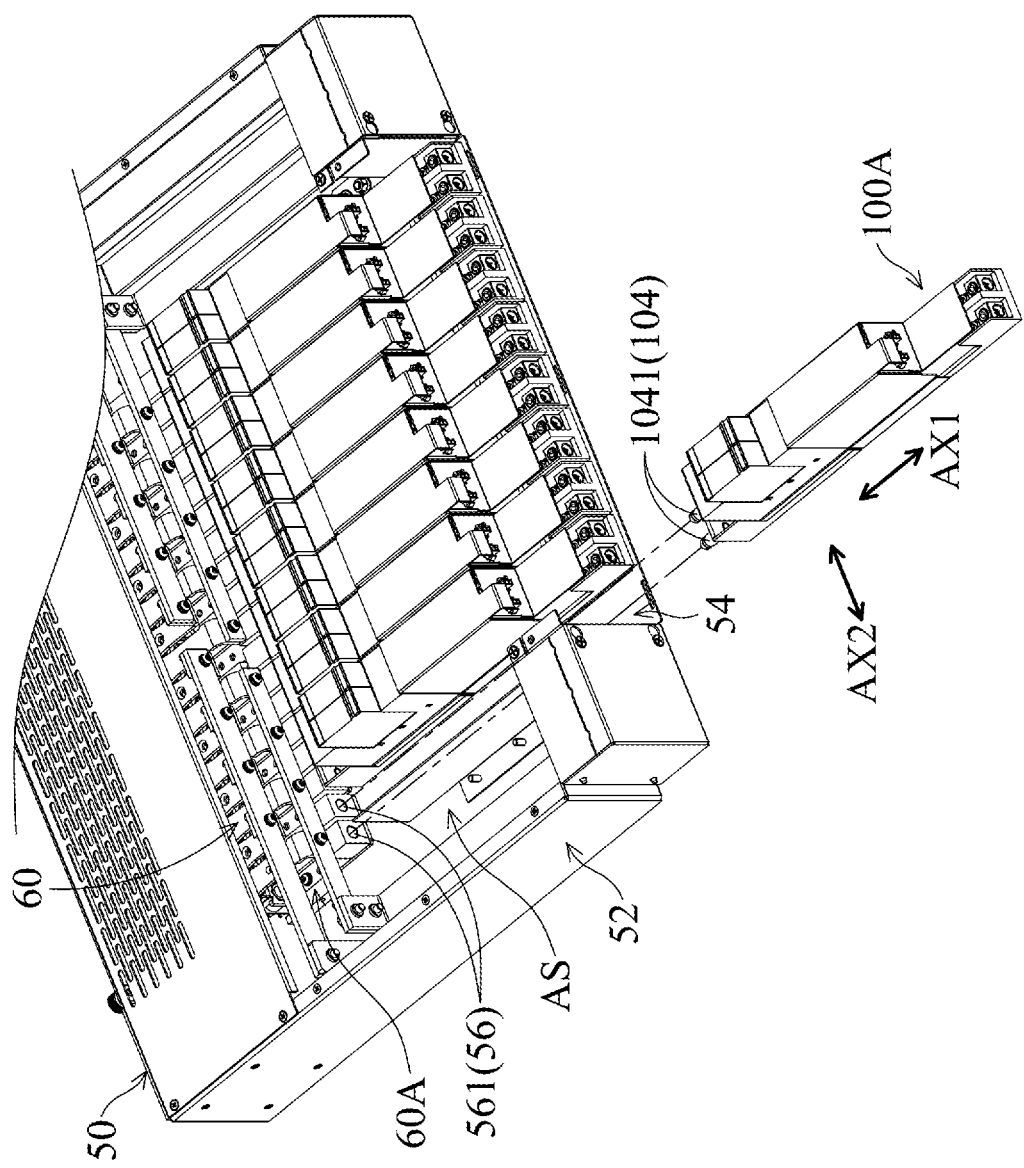
FIG. 3 is a diagram illustrating that the surge protection module 100A is separated from the surge protection apparatus 50 according to an embodiment of the present disclosure.
Figure 4:
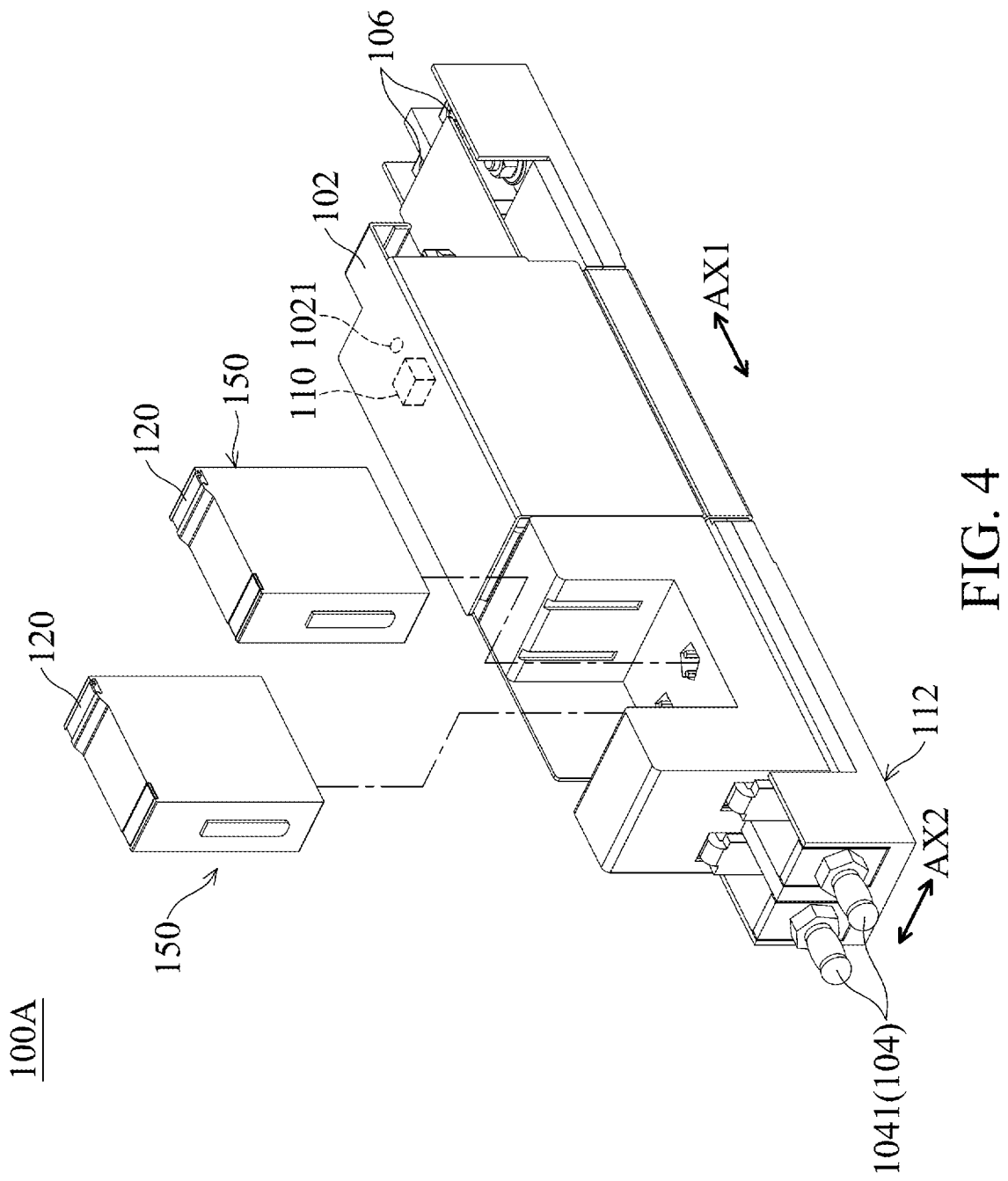
FIG. 4 is a schematic diagram of the surge protection module 100A according to an embodiment of the present disclosure.
Figure 5:
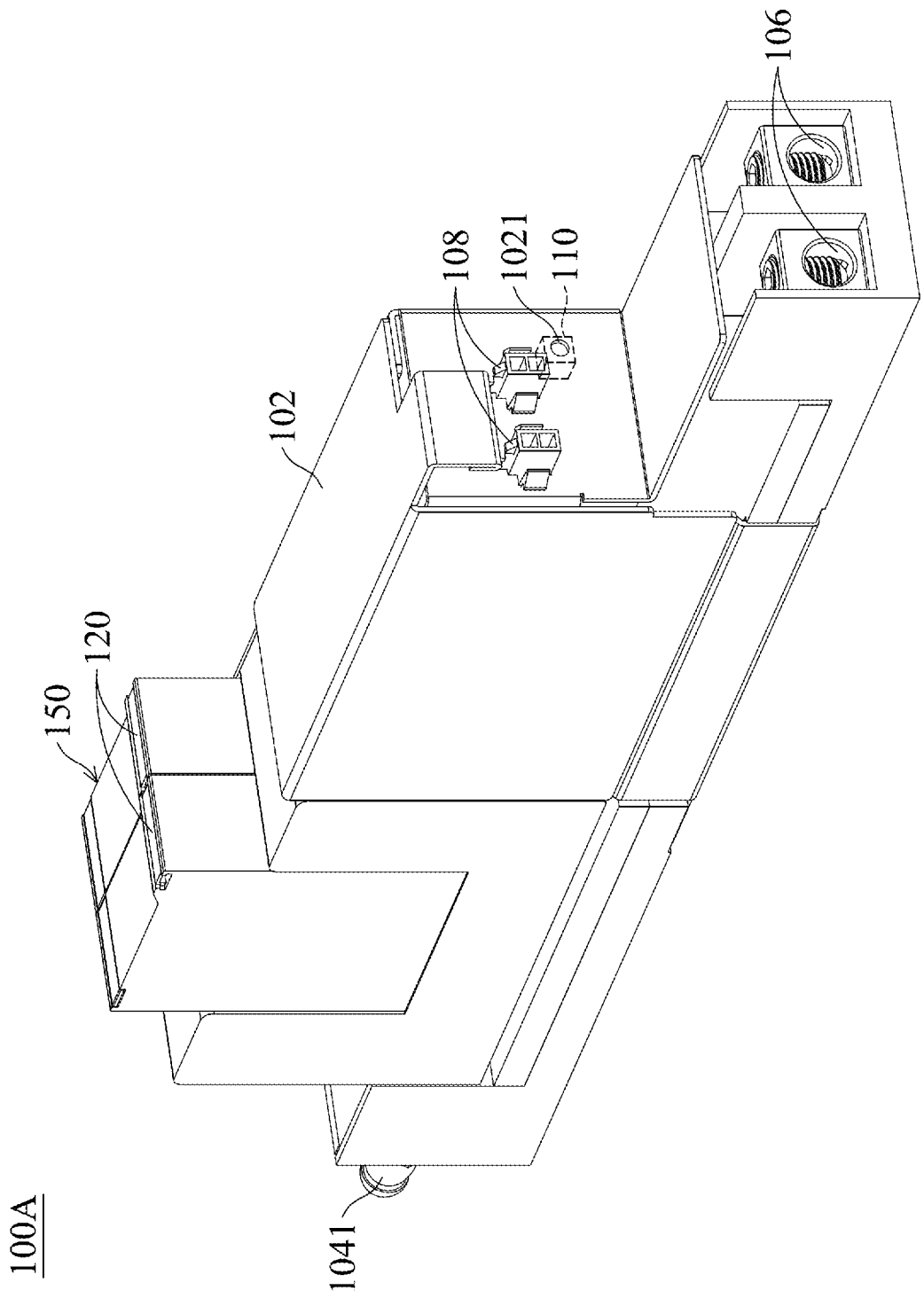
FIG. 5 is a schematic diagram of the surge protection module 100A in another view according to an embodiment of the present disclosure.

Please refer to FIG. 1 to FIG. 5. FIG. 3 is a diagram illustrating that the surge protection module 100A is separated from the surge protection apparatus 50 according to an embodiment of the present disclosure, FIG. 4 is a schematic diagram of the surge protection module 100A according to an embodiment of the present disclosure, and FIG. 5 is a schematic diagram of the surge protection module 100A in another view according to an embodiment of the present disclosure. It should be noted that a top cover 521 of the chassis 52 is omitted in FIG. 3 for clearly showing the internal structure of the surge protection apparatus 50, and the top cover 521 is not removed when the surge protection apparatus 50 operates.

In this embodiment, an opening 54 is formed on the rear of the chassis 52, the opening 54 is communicated with the accommodating space AS, and the opening 54 allows the surge protection modules to pass through. As shown in FIG. 3 to FIG. 5, the surge protection module 100A has a long strip-shaped structure which extends in a first axis AX1, and the surge protection module 100A can be plugged in or pulled out of the chassis 52 through the opening 54 along the first axis AX1.

Similarly, the other surge protection modules can plugged in or pulled out of the chassis 52 through the opening 54 individually, and the surge protection modules 100A-100I can be separately arranged along a second axis AX2, and the second axis AX2 is perpendicular to the first axis AX1.

The surge protection module 100A includes at least one surge protection device 150, and the surge protection device 150 is consumable. When the surge protection module 100A is pulled out of the opening 54, the surge protection devices 150 are replaceable. That is, the surge protection device 150 can be replaced without having to remove the top cover 521, which increases the efficiency of maintenance.

The surge protection module 100A has a casing 102 and a first warning element 110, the first warning element 110 is disposed in the casing 102, and a through hole 1021 is formed on the casing 102. When the surge protection device 150 is broken, the first warning element 110 can be observed through the through hole 1021. For example, the first warning element 110 is a light emitting diode (LED), but it is not limited thereto. The first warning element 110 is configured to issue a warning message (such as the light) through the through hole 1021.

As shown in FIG. 2, when the surge protection module 100A is plugged into the chassis 52, the through hole 1021 is exposed from the opening 54. That is, the first warning element 110 is observable and can be observed easily without removing top cover 521 of the chassis 52.

Furthermore, the surge protection module 100A further has at least one second warning element 120, and when the surge protection device 150 is broken and is pulled out of the chassis 52, the second warning element 120 is observable and can be observed. The second warning element 120 may be a red bar and is shown when the surge protection device 150 is broken.

As shown in FIG. 3 and FIG. 4, the surge protection module 100A includes a first connector 104 extending along the first axis AX1, and the first connector 104 is detachably connected to a second connector 56 of the circuit breaker unit 60A in the chassis 52. In particular, the first connector 104 has two input terminals 1041, and the input terminals 1041 may have a column-shaped structure, a bullet-shaped structure or a piece-shaped structure, serving as male heads, configured to be plugged into two corresponding female heads 561 of the second connector 56. The two female heads 561 are electrically connected to the corresponding surge circuit breakers 60A in this embodiment. That is, one surge circuit breaker corresponds to one second connector 56 in this embodiment, but it is not limited thereto.

In other embodiments, one surge circuit breaker may correspond to two or more second connectors 56. For example, when the surge protection assembly 60 only includes one surge circuit breaker (such as the surge circuit breaker 60A), all the second connectors 56 are electrically connected to the surge circuit breaker 60A.

In this embodiment, when the surge protection module 100A is moved along the first axis AX1 to a first position in FIG. 2, the first connector 104 is coupled to the second connector 56, and when the surge protection module 100A is pulled along the first axis AX1 to a second position in FIG. 3, the first connector 104 is separated from the second connector 56. Based on the design of the input terminals 1041 and the female heads 561, the surge protection module 100A can be installed or detached easily.

In this embodiment, the surge protection module 100A further includes an insulation base 112, the insulation base 112 is configured to separate the two input terminals 1041 along the second axis AX2, so as to ensure that the two input terminals 1041 are not in contact with each other.

Furthermore, as shown in FIG. 4 and FIG. 5, the surge protection module 100A further has two output terminals 106, electrically connected to the corresponding loading device 40A, and the two output terminals 106 are connected to the loading device 40A in a pluggable manner, which increases the efficiency of maintenance.

Figure 6:
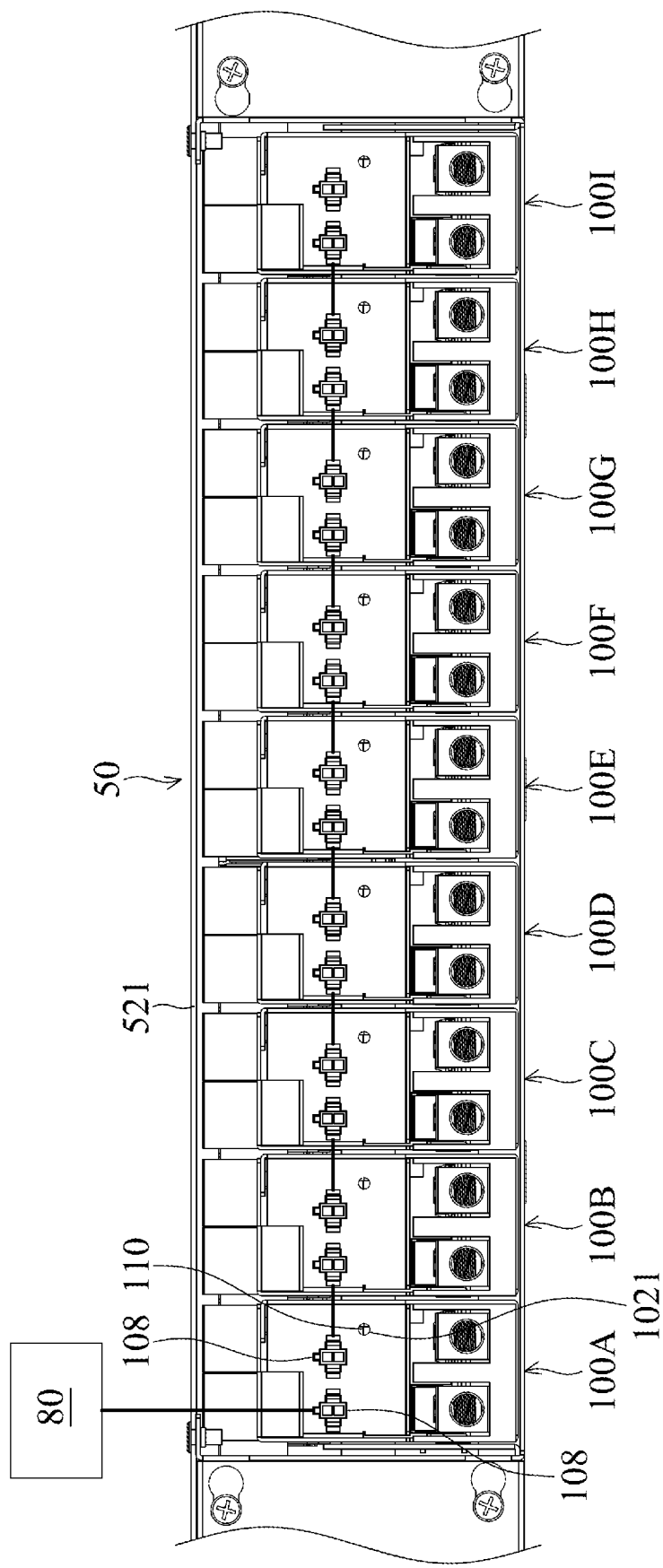
FIG. 6. is an enlarged front view of the surge protection apparatus 50 according to an embodiment of the present disclosure.

Please refer to FIG. 6. FIG. 6. is an enlarged front view of the surge protection apparatus 50 according to an embodiment of the present disclosure. In this embodiment, the surge protection apparatus 50 further includes a monitoring device 80, configured to monitor the surge protection modules 100A to 100I. In addition, each of the surge protection modules 100A to 100I has two monitoring terminals 108 configured to send a monitoring signal to the monitoring device 80, and the monitoring terminals 108 of the surge protection modules 100A to 100I are connected in series.

The monitoring device 80 is configured to determine whether the surge protection modules 100A to 100I are broken according to the monitoring signal. For example, the monitoring device 80 may be a monitoring computer, and when at least one of the surge protection modules 100A to 100I is broken, the monitoring device 80 according to the monitoring signal shows a warning message on a display screen to notify the user that at least one of the surge protection modules 100A to 100I is broken.

Then, the user can check which one of the surge protection modules is broken by observing the through hole 1021. For example, when the surge protection module 100A is broken, the first warning element 110 of surge protection module 100A emits the light through the through hole 1021, and the user can easily find that the surge protection module 100A is broken without detaching the top cover 521 and the surge protection module 100A. Then, the user can easily pull out the surge protection module 100A and replace the broken surge protection device 150 by a new one.

In summary, the present disclosure provides a surge protection apparatus 50, which includes a chassis 52 and a plurality of surge protection modules 100A to 100I. The surge protection modules 100A to 100I are pluggably installed in the chassis 52 and configured to protect the corresponding loading devices. When one of the surge protection modules is broken, the user can easily see the warning message issued by the first warning element 110 on the broken surge protection module without removing the top cover 521, and the user can also easily pull out the surge protection module to replace the broken surge protection device 150 on the surge protection module. Therefore, the design of the present disclosure can effectively improve the maintenance efficiency.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A surge protection apparatus, comprising:
    a chassis, having an accommodating space and an opening, wherein the opening is communicated with the accommodating space;
    a surge circuit breaker, disposed in the accommodating space; and
    a surge protection module, configured to be electrically connected to a second connector in the chassis, and the second connector being electrically connected to the surge circuit breaker;
    wherein the surge protection module extends in a first axis, and the surge protection module is plugged in or pulled out of the chassis through the opening along the first axis;
    wherein the surge protection module includes a first connector detachably connected to the second connector;
    wherein there is no cover to cover the opening;
    wherein the first connector extends along the first axis and has two input terminals, the input terminals have a column-shaped structure, bullet-shaped structure or plate-shaped structure, configured to be plugged into two corresponding female heads of the second connector, and the two female heads are electrically connected to the surge circuit breaker.

2. The surge protection apparatus as claimed in claim 1, wherein the surge protection module has a long strip-shaped structure, the surge protection module includes a surge protection device, and when the surge protection module is pulled out of the opening, the surge protection device is replaceable.

3. The surge protection apparatus as claimed in claim 1, wherein the surge protection module has a casing and a first warning element, the first warning element is disposed in the casing, and a through hole is formed on the casing, wherein when the surge protection device is broken, the first warning element is observable through the through hole.

4. The surge protection apparatus as claimed in claim 3, wherein the surge protection module further has a second warning element, and when the surge protection device is broken and is pulled out of the chassis, the second warning element is observable.

5. The surge protection apparatus as claimed in claim 3, wherein when the surge protection module is plugged into the chassis, the through hole is exposed from the opening.

6. The surge protection apparatus as claimed in claim 1, wherein the surge protection apparatus further includes a monitoring device, the surge protection module has a monitoring terminal configured to send a monitoring signal to the monitoring device, and the monitoring device is configured to determine whether the surge protection module is broken according to the monitoring signal.

7. The surge protection apparatus as claimed in claim 6, wherein the surge protection apparatus includes a plurality of surge protection modules, and the monitoring terminals of the surge protection modules are connected in series.

8. The surge protection apparatus as claimed in claim 1, wherein the surge protection module further includes an insulation base, the insulation base is configured to separate the two input terminals along a second axis, and the second axis is perpendicular to the first axis.

9. The surge protection apparatus as claimed in claim 1, wherein the surge protection module has two output terminals, which are electrically connected to a loading device, and the two output terminals are connected to the loading device in a pluggable manner.

10. The surge protection apparatus as claimed in claim 1, wherein the surge protection apparatus includes a plurality of surge protection modules separately arranged along a second axis, and the second axis is perpendicular to the first axis.

11. A surge protection apparatus, comprising:
    a chassis, having an accommodating space and an opening, wherein the opening is communicated with the accommodating space;
    a surge circuit breaker, disposed in the accommodating space; and
    a surge protection module, configured to be electrically connected to a second connector in the chassis, and the second connector being electrically connected to the surge circuit breaker;
    wherein the surge protection module extends in a first axis, and the surge protection module is plugged in or pulled out of the chassis through the opening along the first axis;
    wherein the surge protection module includes a first connector detachably connected to the second connector;
    wherein the surge protection module has a casing and a first warning element, the first warning element is disposed in the casing, a through hole is formed on the casing, and the first warning element is configured to issue a warning message through the through hole;
    wherein there is no cover to cover the opening;
    wherein when the surge protection module is plugged into the chassis, the through hole is exposed from the opening;
    wherein the through hole is directly observed by a user through the opening.

12. The surge protection apparatus as claimed in claim 11, wherein the surge protection module further has a second warning element, and when the surge protection device is broken and is pulled out of the chassis, the second warning element is observable.

13. The surge protection apparatus as claimed in claim 11, wherein the surge protection apparatus further includes a monitoring device, the surge protection module has a monitoring terminal configured to send a monitoring signal to the monitoring device, and the monitoring device is configured to determine whether the surge protection module is broken according to the monitoring signal.

14. The surge protection apparatus as claimed in claim 13, wherein the surge protection apparatus includes a plurality of surge protection modules, and the monitoring terminals of the surge protection modules are connected in series.

15. The surge protection apparatus as claimed in claim 11, wherein the first connector extends along the first axis and has two input terminals, the input terminals have a column-shaped structure, bullet-shaped structure or plate-shaped structure, configured to be plugged into two corresponding female heads of the second connector, and the two female heads are electrically connected to the surge circuit breaker.

16. The surge protection apparatus as claimed in claim 15, wherein the surge protection module further includes an insulation base, the insulation base is configured to separate the two input terminals along a second axis, and the second axis is perpendicular to the first axis.

17. The surge protection apparatus as claimed in claim 11, wherein the surge protection module has two output terminals which are electrically connected to a loading device, and the two output terminals are connected to the loading device in a pluggable manner.

18. The surge protection apparatus as claimed in claim 11, wherein the surge protection apparatus includes a plurality of surge protection modules separately arranged along a second axis, and the second axis is perpendicular to the first axis.

* * * * *